(12) United States Patent
Schneider

(10) Patent No.: US 6,910,657 B2
(45) Date of Patent: Jun. 28, 2005

(54) SYSTEM AND METHOD FOR LOCATING A TARGET AND GUIDING A VEHICLE TOWARD THE TARGET

(75) Inventor: Arthur J. Schneider, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/448,869

(22) Filed: May 30, 2003

(65) Prior Publication Data

US 2005/0077424 A1 Apr. 14, 2005

(51) Int. Cl.[7] .............................. F41G 7/00; F41G 7/20; F41G 7/30
(52) U.S. Cl. .................... 244/3.11; 244/3.14; 244/3.15; 701/207; 701/213
(58) Field of Search ....................... 342/357.01–357.17, 342/61–65, 118, 119, 126, 175, 195, 450–465; 244/3.1–3.3; 701/200, 205, 206–216, 225, 300, 301, 302

(56) References Cited

U.S. PATENT DOCUMENTS

| | | | | |
|---|---|---|---|---|
| 3,733,604 A | * | 5/1973 | Smith ......................... | 244/3.13 |
| 3,738,593 A | * | 6/1973 | Duvall ........................ | 244/3.14 |
| 3,883,091 A | * | 5/1975 | Schaefer ..................... | 244/3.13 |
| 3,949,955 A | * | 4/1976 | Sykes et al. ................ | 244/3.19 |
| 4,160,974 A | * | 7/1979 | Stavis ......................... | 342/63 |
| 4,179,088 A | * | 12/1979 | French ....................... | 244/3.19 |
| 4,264,907 A | * | 4/1981 | Durand et al. ............. | 244/3.15 |
| 4,315,609 A | * | 2/1982 | McLean et al. ............ | 244/3.14 |

* cited by examiner

Primary Examiner—Bernarr E. Gregory
(74) Attorney, Agent, or Firm—Thomas J. Finn; Leonard A. Alkou; Karl A. Vick

(57) ABSTRACT

A vehicle guidance system. The system includes a first mechanism for tracking a vehicle based on time-of-arrival information associated with energy emanating from the vehicle and providing vehicle position information in response thereto. A second mechanism steers the vehicle based on the vehicle position information. In a specific embodiment, the system of further includes a third mechanism for locating the target based on time-of-arrival information associated with energy radiating from the target and providing target location information in response thereto. The second the second mechanism steers the vehicle based on the target location information and the vehicle position information.

21 Claims, 2 Drawing Sheets

SYSTEM AND METHOD FOR LOCATING A TARGET AND GUIDING A VEHICLE TOWARD THE TARGET

BACKGROUND OF THE INVENTION

1. Field of Invention

This invention relates to target detection and missile guidance. Specifically, the present invention relates to systems and methods for locating a target, such as an unmanned vehicle, and guiding a missile or other controllable device based on the target position.

2. Description of the Related Art

Target tracking and missile guidance systems are employed in various demanding applications including infrared, radar, sonar, and laser target detection and tracking systems employed to detect and shoot down moving targets, such as miniature Unmanned Aerial Vehicles (UAV's) and anti-aircraft batteries.

Time-of-arrival techniques are often employed to locate a radiating target, such as a Surface-to-Air Missile (SAM) battery. For example, three or more aircraft may time the arrival of electromagnetic energy emanating from the SAM battery. By measuring signal arrival time from the battery to the three or more aircraft, the location of the battery is determined. Clocks on the aircraft are synchronized via Global Positioning System (GPS) satellite clocks to enhance distance computation accuracy. Subsequently, a missile equipped with GPS/inertial guidance system is guided toward the measured position, i.e., GPS coordinates of the SAM battery.

The location of the missile during flight is measured by the on-board GPS/inertial guidance system to facilitate missile guidance. However, GPS guidance systems are susceptible to jamming, such as via jamming transmitters located near the target. In addition, GPS/inertial guidance systems often employ an expensive five element null-steering antenna. The null-steering antenna is capable of steering nulls to four jamming units. Consequently, use of more than four jamming units can successfully jam the accompanying GPS/inertial guidance system by overcoming the weak GP signals from satellites.

An inertial measurement unit (IMU) is often coupled to the GPS receiver and is capable of continuing guidance after GPS jamming. However, IMU guidance becomes inaccurate if jamming occurs far from the target. Furthermore, errors introduced via the GPS/inertial guidance system augment initial target location measurement errors, reducing missile-targeting accuracy.

Radar, laser, sonar, and infrared target detecting and tracking systems are often employed to target and shoot moving targets. Such systems, which may be either passive or active systems, measure radar, optical, acoustical, or infrared energy emanating or reflecting from the target, respectively, to detect, track, and guide a missile toward the target. However, such systems often cannot accurately detect and target enemy miniature UAV's, which may be smaller than a model airplane.

Miniature UAV's are often quiet, electrically powered aircraft made of nonreflective (reflect little or no electromagnetic energy) materials. Accordingly, their radar, optical, acoustical, and infrared signatures are very small and difficult to detect using conventional methods. Furthermore, conventional radar, infrared, laser, and acoustical jamming and decoy systems may be employed to help UAV's evade detection.

Miniature UAV's are particularly dangerous, since television cameras or other communications equipment on UAV's may relay information about our troop positions and other reconnaissance to an enemy. UAV's may also be equipped with deadly ordinance.

Hence, a need exists in the art for an accurate target detecting, tracking and missile guidance system that is relatively immune to GPS, radar, laser, and infrared jamming and capable of detecting and destroying miniature UAV's.

SUMMARY OF THE INVENTION

The need in the art is addressed by the vehicle guidance system of the present invention. In the illustrative embodiment, the inventive system is adapted to defend against miniature unmanned aerial vehicles. The system includes a first mechanism for tracking a vehicle based on time-of-arrival information associated with energy emanating from the vehicle and providing vehicle position information in response thereto. A second mechanism steers the vehicle based on the vehicle position information.

In a specific embodiment, the system further includes a third mechanism for employing the first mechanism to locate a target based on time-of-arrival information associated with energy radiating from the target and providing target location information in response thereto. The second mechanism steers the vehicle based on the target location and the vehicle position.

In the specific embodiment, the vehicle is a missile. The third mechanism includes three or more receivers equipped to perform trilateration based on the energy radiating from the target to determine the target location information and the vehicle position information. In one embodiment, the target is a ground-based target, and the three or more receivers are positioned on three or more aircraft and/or spacecraft. In another embodiment, the target is a miniature aerial vehicle, and the energy radiating from the target includes television signals.

In the the specific embodiment, the system further includes a fourth mechanism for dispatching the missile in response to detection of the target by the third mechanism. In one embodiment, the fourth mechanism includes a portable missile launcher in communication with a controller associated with a master receiver, which is one of the three or more receivers. The third mechanism includes a mechanism for providing time-of-arrival information associated with the energy radiating from the target and the energy emanating from the missile from the three or more receivers to the controller on the master receiver. The controller includes a mechanism for computing the target location information and the vehicle position information based on the time-of-arrival information and extrapolating the data to intercept.

A radiator on the missile radiates electromagnetic energy having a predetermined waveform. The first mechanism includes an algorithm running on the controller for computing the missile position based on time-of-arrival information associated with the energy emanating from the missile; detected by the three or more receivers; and provided to the controller in communication with the master receiver. The second mechanism includes a guidance algorithm running on the master controller. The guidance algorithm generates steering commands and forwards the steering commands to the missile to command an accompanying missile steering system.

The novel design of the present invention is facilitated by the first mechanism, which employs the same time-of-arrival techniques and system to determine the position of the missile as are used to determine the position of the target. The missile may then be guided based on the measurement of the position of the missile. Consequently, the need to guide the missile based on sensors on the missile detecting infrared, radar, sonar, or other signals emanating from a target is either obviated or enormously reduces the search volume of the accompanying terminal seeker guidance system. Consequently, small targets that emit little if any infrared energy and reflect few radar, sonar, laser, or microwave signals, may be readily located and destroyed. Furthermore, requirements that the missile constantly measure its position based GPS signals from GPS satellites received by GPS receivers on the missile are obviated. Consequently, the missile system is relatively immune to GPS jamming that could otherwise occur as the missile neared a target surrounded by GPS jamming systems. In addition, the need for highly accurate inertial reference units and other expensive guidance systems is reduced.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
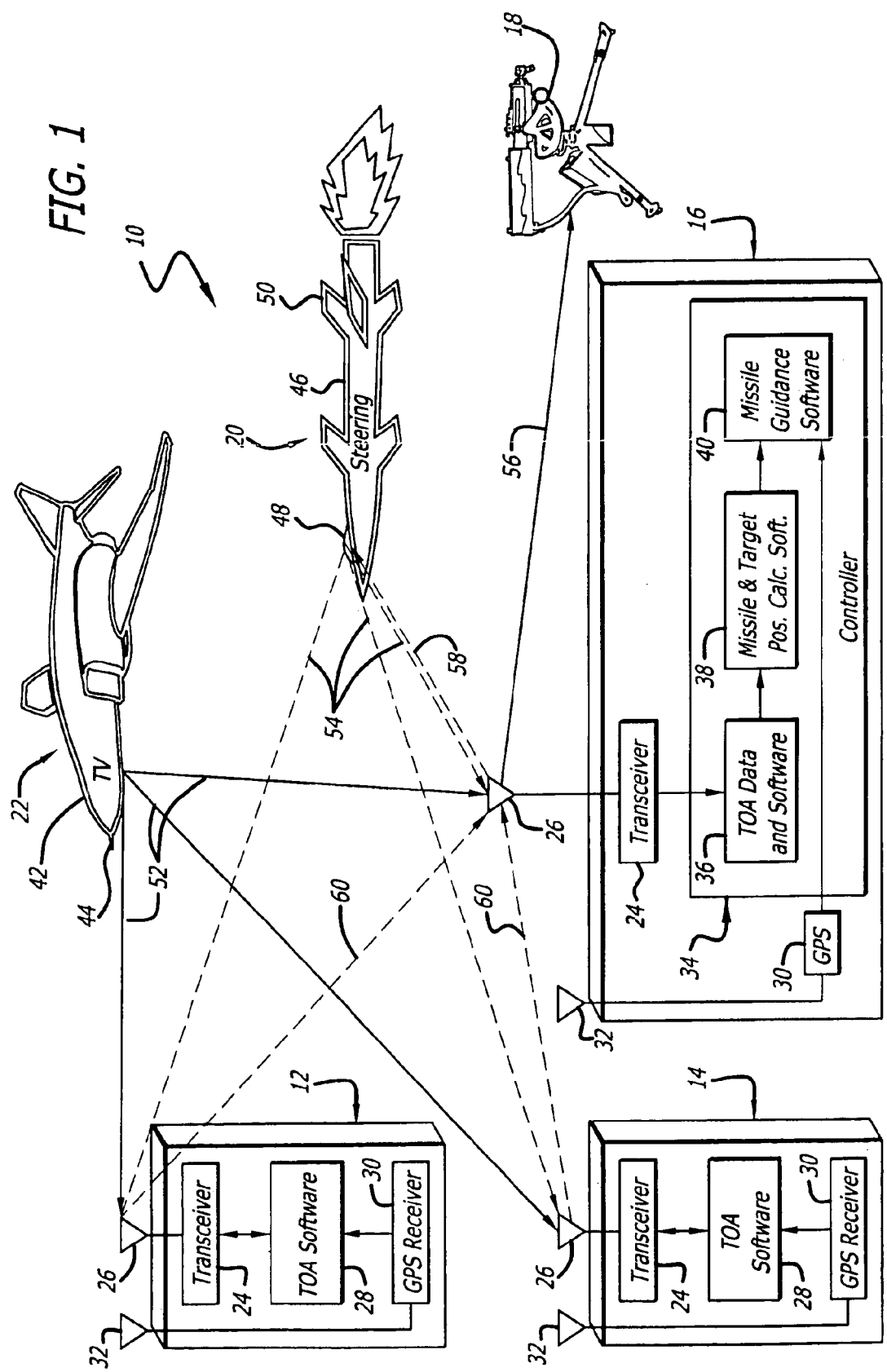
FIG. 1 is a diagram of a system constructed in accordance with the teachings of the present invention for detecting, tracking, and destroying a target.

FIG. 1 is a diagram of a system 10 constructed in accordance with the teachings of the present invention for detecting, tracking, and destroying a target 22. For clarity, various components, such as power supplies, amplifiers, mixers, signal downconverters, duplexers, operating systems, and so on, have been omitted from the figures. However, those skilled in he art with access to the present teachings will know which components to implement and how to implement them to meet the needs of a given application.

The system 10 includes a first transceiver system 12 and a second transceiver system 14 in communication with a master transceiver system 16. In the present specific embodiment, the master transceiver system 16 also communicates with a missile launcher 18, and a missile 20 that acts as an intercept vehicle. The transceiver systems 12–16 can detect television signals or other radiation from a miniature Unmanned Aerial Vehicle (UAV) 22.

Each transceiver system 12–16 includes a transceiver front-end 24 and accompanying antenna 26. The transceiver front-end 24 and accompanying antenna 26 are capable of receiving and transmitting at various frequencies, including television frequencies. The transceiver front-end 24 communicates with Time-Of-Arrival (TOA) software 28, which receives input from a Global Positioning System (GPS) receiver 30 and accompanying GPS receiver antenna 32.

The master transceiver system 16 maintains additional TOA data and software 36 running on a controller 34. The TOA data and software 36 receives input from the transceiver 24 and provides output to a missile and target position calculation software module 38 running on the controller 34. The missile and target position calculation software 38 provides output to missile guidance software 40, which receives additional input from the GPS receiver 30. The missile guidance software 40 communicates with the missile system 20 and missile launcher 18 via the transceiver 24 and accompanying antenna 26 of the master transceiver system 16.

The miniature UAV 22 includes a TV camera 42 and a TV transmitter 44. The TV camera 42 and transmitter 44 may be replaced with another type of camera and transmitter, such as an infrared camera and an infrared image transmitter, without departing from the scope of the present invention.

The missile 20 includes a steering system 46 in communication with a sensor dome 48. The steering system 46 provides controls signals to controllable fins 50 to facilitate steering the missile 20.

In operation, the miniature UAV 22 employs the TV camera 42 to gather reconnaissance information, which is transmitted back to a predetermined transceiver (not shown), such as an enemy camp, via TV signals 52. The television signals 52 are detected and timed by the transceiver systems 12–16. The time at which a given TV signal 52 arrives at the transceiver systems 12–16 is measured by TOA software 28 and 36 in communication with the GPS receivers 30.

When the TV signals 52 are detected by the master transceiver system 16, and the range of the UAV 22 is determined to be within the range of the missile 20, a launch enable signal 56 is transmitted to the missile launcher 18. Alternatively, the launch enable signal 56 may be implemented as a launch signal that triggers automatic launching of the missile 20, rather than merely enabling launching of the missile 30, without departing from the scope of the present invention. Furthermore, use of the launch enable signal 56 may be omitted without departing from the scope of the present invention.

A user may manually launch the missile 20 from the missile launcher 18 when the launcher 18 becomes enabled via the enable signals 56. When the launcher 18 becomes enabled, an alarm of other mechanism notifies a user that TV signals from a UAV have been detected and that the UAV 22 is within range of the missile 20. The user may then manually control the firing of the launcher 18 to launch the missile 20.

The GPS receivers 30 located on each transceiver system 12–16 specify the current location of each transceiver system 12–16 and facilitate accurate time keeping via methods known in the art. The GPS receivers 30 also ensure that clocks (not shown) included in the transceiver systems 12–16 are accurate and consistent so that measurements of signal arrival times are accurate.

Upon launch, the missile 20 begins transmitting predetermined missile-locating signals 54 having a predetermined waveform. For example, the missile-locating signals 54 may be 30 Hz pulsed signals, which are detected by the transceiver systems 12–16. Times of arrival of the signals 54 are also measured by the TOA software 28 and 36, which is in communication with the GPS receivers 30.

Knowledge of the waveform of the TV signals 52 and the missile-locating signals 54 enable the transceiver systems 12–16 to determine accurate time-of-arrival measurements of the TV signals 52 and the missile-locating signals 54. Alternatively, differences in signal arrival times may be determined through analysis of phase differences detected by each transceiver system 12–16 via novel techniques or via techniques known in the art.

The locations of the transceiver systems 12–16 and the TOA measurement data associated with the signals 52 and 54 are provided to the TOA data and software 36 running on the controller 34 of the master transceiver system 16. TOA data 60 associated with the signals 52 and 54 and positions of the first transceiver system 12 and the second transceiver system 14 are determined via TOA software 28 and the GPS receivers 30, respectively. This information 60 is forwarded to the TOA data and software module 36 via the transceiver front-end 24 of the master transceiver system 16. The position of the master transceiver system 16 is measured by the accompanying GPS receiver 30 and forwarded to the TOA data and software module 36 within the master transceiver system 16. In the present specific embodiment, the transceiver systems 12–16 are positioned at the vertices of a right triangle with legs longer than approximately 100 meters.

By measuring the signal arrival times of the TV signals 52, for example, the transceiver systems 12–16 may perform trilateration to determine the location of the miniature UAV 22. For the purposes of the present discussion, the term trilateration refers to any technique(s) used to determine the location of or a path to an object or source of radiation based on arrival times of signals emanating from or reflecting from the object or source of radiation.

For example, the first transceiver system 12 can determine the distance to the UAV 22 by measuring signal arrival times and using the speed at which the signals 52 travel, which is the speed of light for TV signals, to determine the distance of the UAV 22 from the transceiver system 12. Measurement of the time required for the TV signals 52 to arrive at the first transceiver system 12 is facilitated by predetermined knowledge of the structure of the TV signals 52 and/or knowledge of the exact time at which a given TV signal 52 is transmitted from the UAV 22.

By using TOA data for each transceiver system 12–16, three spheres upon which the UAV 22 may be positioned are determined. For example, if the TOA data measured by the first transceiver system 12 indicates that the UAV is 5 miles away as determined via the missile and target position calculation software 38, then the UAV 22 is positioned somewhere on a sphere (not shown) with a radius of 5 miles about the first transceiver system 12. A similar sphere is computed, via the missile and target position calculation software 38 running on the master transceiver 16, for the TOA data from the second transceiver system 14. The intersection of these two spheres is a circle (not shown) that contains the position of the UAV 16. A third sphere is computed from the TOA data measured by the master transceiver system 16 and specifies the distance of the UAV from the master transceiver system 16. The third sphere and the circle will intersect at two points. One of these points can be eliminated. For example, one of the points may indicate that the UAV 22 is underground. This data point is discarded. The remaining data point is the position of the UAV 22.

Each pair of transceivers 12 and 14, 14 and 16, and 12 and 16 may he thought of as computing a plane (not shown), containing the above-mentioned circle, and containing the source 22 of the radiation 52. The intersection of any two of the planes defines a line to the UAV 22.

A similar TOA process, using the same software and hardware is employed to compute the position of the missile 20 based on TOA data associated with the signals 54 radiated from the missile system 20 and having a predetermined waveform. The missile target and position calculation software 38 then forwards position data pertaining to the location of the missile 20 and the UAV 22 to the missile guidance software 40.

The missile guidance software 40 that is running on the controller 34 of the master transceiver system 16 uses the UAV and missile position data to generate missile guidance commands 58. The missile guidance commands 58 are effective to drive the position of the missile toward the predicted position of the UAV 22. The predicted position of the UAV may be determined through extrapolation techniques known in the art, such as linear extrapolation based on recently measured positions. The missile guidance commands 58 are received by the missile steering system 46, which then controls the direction of the missile 20 via the steering fins 50 accordingly.

Methods other than the above-described trilateration process may be employed to determine the location of the miniature UAV 22 and the missile 22 without departing from the scope of the present invention. However, preferably, similar methods are used to compute the location of the UAV and to compute the location of the missile 20.

In absence of knowledge of when the UAV 22 begins transmitting a certain signal, differences in signal arrival times at the different transceiver systems 12–16 alone may be used to define a line toward a target. For example, by measuring the time difference of arrival of the TV signals 52 between any of the two transceivers 12–16, a plane containing the position of UAV 22, i.e., the position of the emitter or antenna 44 of the UAV 22 is determined. In this case, the transceivers 12–16 are preferably separated by distances that are relatively large compared to the distance to the radiating target 22. In addition, the angle formed by the location of the transceivers 12–16 is preferably larger than 45 degrees. The exact separation distances and angles are application-specific and may be determined by one skilled in the art to meet the needs of a given application without undue experimentation.

For the purposes of the present discussion, the position of the TV camera 42 and accompanying antenna 44, often called the emitter, is used interchangeably with the position of the UAV 22, since the emitter 44 is mounted on the UAV 22.

The transceivers 12–14 are capable of recognizing very short time characteristics of the transmitted signal 52 so that the TOA of the signal 52 can be clocked precisely. GPS facilitates establishment of a common time base shared by the transceivers 12–16. The transceivers 12–16 are capable of recognizing the same signal characteristic in the signal 52.

Consider the first transceiver 12 and the second transceiver 14. The Time Difference of Arrival (TDOA) of the signals 52 at the transceivers 12 and 14 specifies the approximate location of a plane surface (not shown) between the transceivers 12 and 14 that is the locus of all possible positions in space of the UAV 22. Those skilled in the art will appreciate that TDOA techniques are a subset of TOA techniques such that a TDOA technique is also a TOA technique.

Now consider transceivers 14 and 16. The TOA of the signals 52 at the transceivers 14 and 16 specifies another plane (not shown) surface (not shown) between the transceivers 14 and 16 that contains the UAV 22. The intersection of the two planes is a line that contains the position of the UAV 22.

Finally, consider transceivers 12 and 16. The TDOA of the signals 52 at the transceivers 12 and 16 specifies a third plane surface that contains the UAV 22. This plane surface intersects the line previously defined in a single point, which is the location of the emitter. In applications employing TDOA techniques, typically all of the calculations are based on TDOA at the transceivers 12–16 not the travel time of the signal 52 from the UAV 22 to the transceivers 12–16.

The missile launcher 18 includes a transceiver in communication with a missile-launch-enabling system (not shown) via the communications link 56 represented by the launch enable signals 56. The missile-launch-enabling system is responsive to the launch enable signals 56 from the controller 34 of the master transceiver system 16.

Various modules, such as the missile guidance software 40, the missile and target position calculation software 38, and TOA software 28 modules may be implemented in hardware or a combination of hardware and software without departing from the scope of the present invention. Furthermore, the GPS receivers 30 may be omitted from the transceiver systems 12–16 in certain applications, particularly in applications wherein the positions of the transceiver systems 12–16 are already known or can be established via other mechanisms. In applications lacking the GPS receivers 30, the transceiver systems 12–16 may have accurate clocks, such as atomic clocks to facilitate accurate missile and target position calculations via the missile and target position calculation software 38 running on the controller 34 of the master transceiver system 16.

In the present specific embodiment, various communications links 54, 56, and 58 are one-way links. However, dual links having an uplink and a downlink may be employed without departing from the scope of the present invention. For example, the guidance commands 58, representing the control link 58 to the missile 20, may be a dual link, enabling the missile steering system 46 to provide feedback to the controller 34 of the master transceiver system 16.

Hence, the same TOA system, comprising the transceiver systems 12–16 and TOA software 28 and 36 used to locate the radiating target 22 is used to track the location of the attacking missile 20 in real time as it flies toward the target 22, which may no longer be radiating. The missile 20 is equipped with a radiating element in the sensor dome 48 that radiates a signal 54, such as a spread spectrum signal 54, that is relatively resistant to jamming. Alternatively, the radiating signal 54 may include short identifiable pulses, such as a 30 Hz pulses.

Frequent measurements enable the system 10 to establish the line between the missile 20 and the UAV target 22 in addition to the line-of-sight rotation rate of the missile 20. The guidance control software 40 may employ various proportional guidance control algorithms to guide the missile 20 to cancel the line-of-sight rotation rate. The guidance calculations may be made on the master transceiver system 16, which may be positioned on an aircraft, as discussed more fully below. A forward data link, such as the represented by the guidance commands 58 from the master transceiver system 16 to the missile 20 commands the steering system 46 of the missile 20.

TOA guidance in accordance with the teachings of the present invention uses the same or similar TOA equipment 12–16 to guide the missile 20 as was used to locate the target 22. Consequently, some measurement errors will cancel instead of adding, thereby reducing overall guidance error.

Furthermore, by using the same equipment 12–16 to locate and guide the missile as used to locate the target, little additional equipment is required to implement the present invention. In addition, conventional GPS guidance systems, which often require complex and expensive null-steering multi-element antennas, may be removed from the missile 20, thereby reducing overall system cost. Furthermore, use of an Inertial Measurement Unit (IMU) (not shown) may no longer be required, thereby further reducing system cost. In addition, expensive missile seekers, such as laser, radar, infrared, or microwave seekers may be omitted. However, missile seekers and/or GPS/IMU guidance systems may be included on the missile 20 and combined with guidance techniques disclosed herein to improve terminal accuracy, without departing from the scope of the present invention.

If GPS systems of the ground-based transceivers 12–16 are jammed, the last position updates and clock updates before the jamming occurred are employed to determine the location of the UAV 22 and guide the missile 20 to the target 22. Unlike existing systems, which may rely on GPS signals received by the missile 20 until impact with a target, target detection and missile guidance systems constructed in accordance with the teachings of the present invention can accurately steer the missile 20 to impact the UAV 22 without relying on the missile 20 receiving real-time GPS position information directly from GPS satellites.

The transceiver systems 12–16 may be constructed similarly so that either of the systems 12–16 may act as the master transceiver system 16 when desired. The transceiver systems 12–16 may be implemented in preexisting portable communications equipment that soldiers often carry. When a soldier detects the incoming UAV 22, he can employ his transceiver system to assume the role of the master transceiver system 16. The soldier may then nominate two other soldiers to use their transceiver systems to act as the slave transceiver systems 12–14. One of the soldiers may carry the small missile 20, which is designed to shoot down the miniature UAV 22.

The system 10 capitalizes on the easily detectable signature of the miniature UAV 22, which is the transmitted TV signal 52, which may also be another type of signal, such as an LR image signal. By using the three TOA-measuring receivers 12–16, the UAV 22 can be tracked in space. The missile 20 may use a pulsed emitter that can be tracked by the same transceiver systems 12–16 simultaneously with the UAV 22.

The system 10 is relatively inexpensive due to the small warhead 20; the fact that emitter 48 used to generate the pulsed signals 54 is relatively inexpensive; and the fact that the missile 20 may not require a seeker, which often comprises 60% of the total cost of a missile.

At TV frequencies below 1 GHz, RF can be transmitted through foliage and many buildings, enhancing system applicability. The requisite GPS/TV receivers 24 and 30 are relatively small and may be readily carried by foot soldiers.

Figure 2:
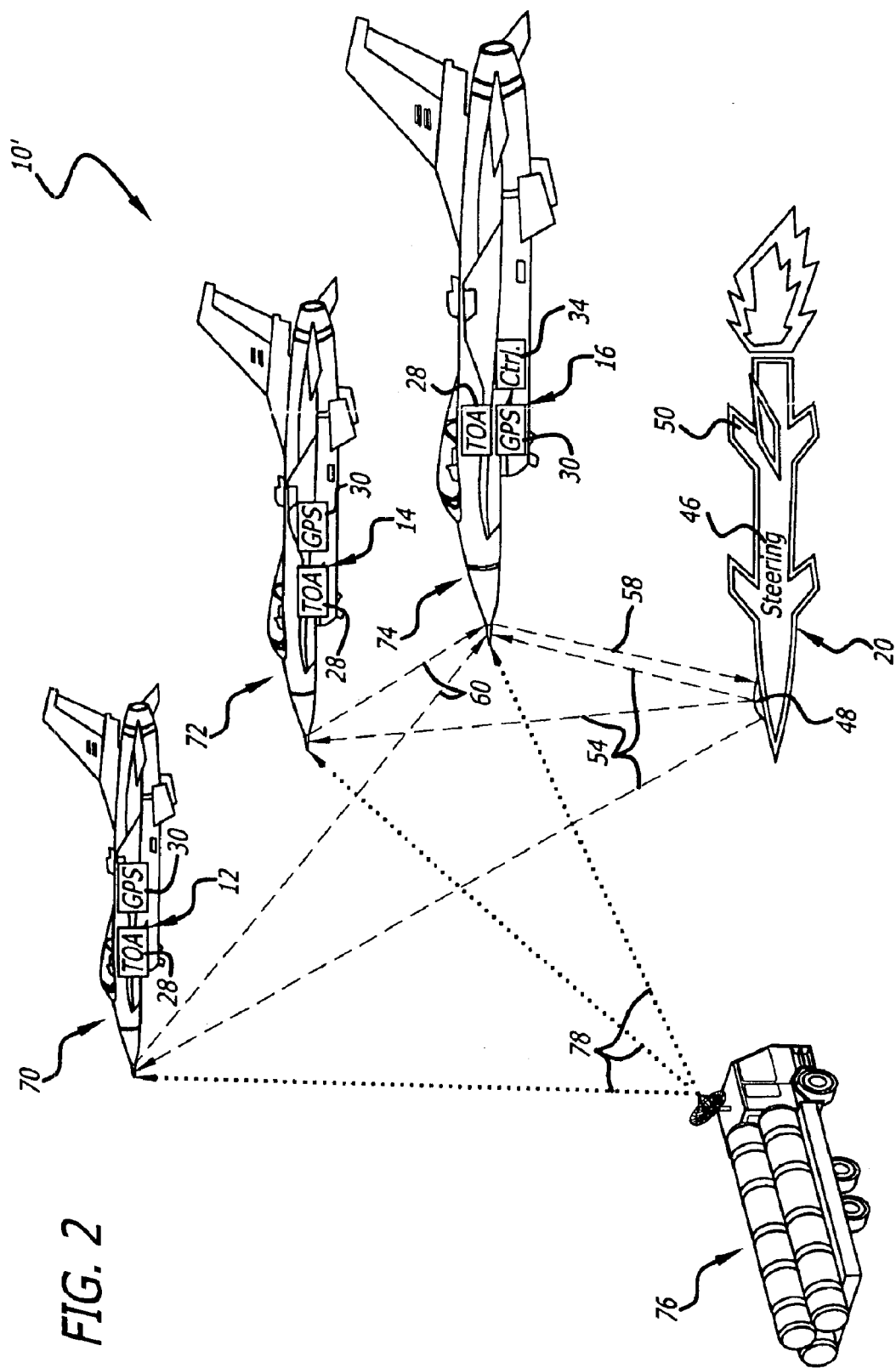
FIG. 2 is a diagram of an alternative embodiment of the system of FIG. 1 adapted for use with air or space-based transceivers.

FIG. 2 is a diagram of an alternative embodiment 10' of the system 10 of FIG. 1 adapted for use with air or space-based transceivers 12–16. In the embodiment 10' of FIG. 2, the transceiver systems 12–16 are installed on aircraft 70, 72, and 74, respectively. The operation of the system 10' is similar to the operation of the system 10 of FIG. 1 with the exception that the ground-based transceiver systems 12–16 of FIG. 1 are installed on aircraft 70–74. In addition, the UAV target 22 of FIG. 1 is replaced with a ground-based air defense radar unit 76 in FIG. 2.

The aircraft 74 is considered the master aircraft. However, any of the other aircraft 70 or 72, which are equipped with transceiver systems 12 and 14 similar to the master transceiver system 16, may act as the master aircraft, which accommodates the master transceiver system 16. The aircraft that first detects signals 78 emanating from a target, such as an air defense radar unit 76, may be designated as the master aircraft.

The present disclosure describes a second mode of missile guidance that is relatively immune to GPS jamming. The same TOA system that has located the radiating target 76 is used to track the location of the missile 20 in real time as it flies toward the target 76, which may no longer be radiating. This is accomplished by using the radiating unit 48 on the missile 20. The radiating unit 48 transmits a short identifiable pulsed waveform.

As in the embodiment 10 of FIG. 1, frequent measurements, such as at 30 Hz, enable the TOA system 12–16 to establish a line between the missile and the target 76; then calculate the line of sight rotation rate. Proportional guidance can then be used to drive the LOS rate to zero, ensuring little or no miss distance. Calculations are made on the master aircraft 74, which uses a forward link, corresponding to the guidance commands 58, to guide the missile 20.

Accuracy is improved over that of GPS guidance systems, since GPS guidance errors will add to errors in the target location measurement. However, TOA guidance in accordance with the teachings of the present disclosure uses similar equipment, software, and methods to guide the missile 20 as used to locate the target 76. Consequently, some errors will cancel instead of adding, thereby reducing overall guidance error.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for locating a target and guiding a vehicle based on a position of said target comprising:
   first means for tracking a vehicle based on time-of-arrival information associated with energy transmitted from said vehicle and providing vehicle position information in response thereto;
   second means for steering said vehicle based on said vehicle position information; and
   third means for employing said first means to locate a target based on time-of-arrival information associated with energy transmitted from said target and providing target location information in response thereto, said second means further including means for steering said vehicle based on said target location information and said vehicle position information.

2. The system of claim 1 wherein said vehicle is an intercepting missile.

3. The system of claim 1 wherein said third means includes three or more receivers equipped to determine said target location information and said vehicle position information based on energy transmitted from said target and said energy transmitted from said vehicle, respectively.

4. The system of claim 3 wherein said three or more receivers include means for performing trilateration based on said energy transmitted from said target and transmitted from said vehicle.

5. The system of claim 4 wherein said target is a ground-based target, and wherein said three or more receivers are positioned on three or more aircraft and/or spacecraft.

6. The system of claim 5 wherein said target is an aerial vehicle.

7. The system of claim 6 wherein said aerial vehicle is an unmanned aerial vehicle.

8. The system of claim 7 wherein said energy transmitted from said target includes television signals.

9. The system of claim 8 further including fourth means for dispatching said vehicle in response to detection of said target by said third means.

10. The system of claim 9 wherein said fourth means includes a portable missile launcher in communication with a controller associated with a master receiver included in said three or more receivers.

11. The system of claim 10 wherein third means includes means for providing time-of-arrival information associated with said energy transmitted from said target and said energy transmitted from said missile from said three or more receivers to said controller on said master receiver.

12. The system of claim 11 wherein said controller includes a mechanism for computing said target location information and said vehicle position information based on said time-of-arrival information.

13. The system of claim 12 wherein said missile includes a radiator and wherein said energy transmitted from said missile is electromagnetic energy having a predetermined waveform.

14. The system of claim 13 wherein said first means includes an algorithm running on said controller for computing said missile position based on time-of-arrival information associated with said energy transmitted from said missile; detected by said three or more receivers; and provided to said controller in communication with said master receiver.

15. The system of claim 14 wherein said second means includes a guidance algorithm running on said controller, said guidance algorithm generating steering commands and forwarding said commands to said missile to command a missile steering system included on said missile.

16. A system for locating a target comprising:
   first means for receiving television signals from said target and providing timing information in response thereto and
   second means for locating said target based on said timing information.

17. The system of claim 16 wherein said target is a moving vehicle.

18. The system of claim 17 wherein said moving vehicle is an unmanned aerial vehicle.

19. The system of claim 18 further including third means for guiding a missile toward said aerial vehicle based on a location of said vehicle determined via said second means and based on positions of said missile as determined via said second means via energy transmitted from said missile.

20. The system of claim 19 wherein said second means includes one or more receivers arranged to perform trilateration on said television signals and said energy transmitted from said missile to determine said location of said aerial vehicle and said positions of said missile.

21. A method for locating a target and guiding a vehicle based on a position of said target including the steps of:
   tracking a vehicle based on time-of-arrival information associated with energy transmitted from said vehicle and providing vehicle position information in response thereto;

steering said vehicle based on said vehicle position information; and locating a target based on time-of-arrival information associated with energy transmitted from said target and providing target location information in response thereto, further including the step of steering said vehicle based on said target location information and said vehicle position information.

* * * * *